(12) United States Patent
Beom (10) Patent No.: US 6,298,937 B1
(45) Date of Patent: Oct. 9, 2001

(54) LOADER WITH AN IMPROVED PARKING BRAKE DEVICE

(75) Inventor: Jin Seok Beom, Incheon (KR)

(73) Assignee: Daewoo Heavy Industries Ltd., Incheon (KR)

( * ) Notice: Subject to any disclaimer, the term of this patent is extended or adjusted under 35 U.S.C. 154(b) by 0 days.

(21) Appl. No.: 09/384,344

(22) Filed: Aug. 27, 1999

(30) Foreign Application Priority Data

Aug. 28, 1998 (KR) .................................................. 98-16213

(51) Int. Cl.⁷ ........................................................ B60T 7/12
(52) U.S. Cl. ............................ 180/272; 180/268; 74/500.5
(58) Field of Search ................................... 180/272, 273, 180/268, 269; 280/256; 74/512, 500.5, 501.5 R (56) References Cited

U.S. PATENT DOCUMENTS

| | | | |
|---|---|---|---|
| 3,892,294 | * | 7/1975 | Nieminski .............................. 188/109 |
| 4,955,452 | * | 9/1990 | Simonz ................................. 180/271 |
| 5,050,700 | * | 9/1991 | Kim ..................................... 180/268 |
| 5,315,893 | * | 5/1994 | Behrens et al. ......................... 74/512 |
| 5,971,434 | * | 10/1999 | Nuefeld et al. ....................... 280/256 |
| 5,992,576 | * | 11/1999 | Berg et al. ............................. 188/69 |

\* cited by examiner

*Primary Examiner*—Peter C. English
*Assistant Examiner*—Christopher Buchanan
(74) *Attorney, Agent, or Firm*—Staas & Halsey LLP (57) ABSTRACT

A loader which can provide the operator with enhanced safety comprises a vehicle body carrying a canopy and a rotating vehicle axle, a seat bar mounted to the canopy for swinging movement between a raised position and a lowered, operator restraint position, a parking lever shiftable between a brake position and a release position and cooperatingly associated with the seat bar, an axle lock operatively connected to the seat bar and the parking lever and operable to lock or release the vehicle axle, and conditional force delivery mechanism for normally allowing the axle lock to brake the vehicle axle and for causing the axle lock to release the vehicle axle only when the seat bar is in the lowered position with the parking lever shifted into the release position.

8 Claims, 6 Drawing Sheets

LOADER WITH AN IMPROVED PARKING BRAKE DEVICE

FIELD OF THE INVENTION

The present invention generally relates to a loader and more specifically to a parking brake device for a skid steer loader of the type which, even at the time of a parking lever being released, can keep front axles of the loader locked against any rotating movement until and unless a seat bar is swung down into a lowered position.

BACKGROUND OF THE INVENTION

Typical loaders include a vehicle body and a canopy mounted on the body for enclosing an operator's seat. The canopy is provided with a front opening that allows the operator to gain access to the operator's seat. Some types of loaders are expected to run over rough terrain, make sudden stops and turns, and are subject to sudden tilting and lurching. A skid steer loader is a type of loader in which the operator often encounters rough ride conditions.

For the operator to be protected safely under the rough ride conditions, need exists for safety devices that can restrain the body of the operator to the seat. The conventional safety devices include a seat bar pivotally mounted to the opposite side walls of the canopy for swing movement about a pivot axis between a raised position and a lowered position. The seat bar remaining in the raised position permits the operator to take or leave the seat through the front opening of the canopy. The operator would be restrained between the seat and the seat bar in case where the seat bar assumes the lowered position. This will keep the operator adhered to the seat even under the rough ride conditions, thus removing the possibility of the operator being thrown from the seat due to the sudden movement of the loader.

In addition to the seat bar, the skid steer loader is provided with a parking brake device which can lock right and left, independently rotatable, front axles against any rotation when the loader is parked and not in service. The conventional parking brake device consists usually of a parking lever manually shiftable between parking and release positions, a rotating disk affixed to the respective one of the right and left front axles and having a plurality of circumferentially disposed notches, a locking pawl releasably engageable with one of the notches of the rotating disk, and a motion delivery mechanism for operatively connecting the parking lever to the locking pawl such that the locking pawl comes into engagement with the notches of the rotating disk as the parking lever is shifted into the parking position.

In the course of driving the skid steer loader referred to above, there may take place such an instance that the parking lever is shifted into the release position by the operator to thereby allow movement of the loader while the seat bar is still in the raised position wherein the operator is not restrained at all. In this instance, the operator would be put in danger and sometimes may be thrown out of the seat particularly when the loader begins to move suddenly. In order to avoid such accident, need has existed for a parking brake device which cooperates with the seat bar in order to bring the loader into a non-parking condition.

SUMMARY OF THE INVENTION

With the foregoing problems in mind, it is therefore an object of the invention to provide a loader that can keep its parking condition until and unless a seat bar is swung down into a lowered, operator restraint position with a parking lever shifted into a release position, thus providing the loader operator with enhanced safety.

In accordance with the invention, there is provided a loader comprising: a vehicle body carrying a canopy and a rotating vehicle axle; a seat bar mounted to the canopy for swinging movement between a raised position and a lowered, operator restraint position; a parking lever shiftable between a brake position and a release position and cooperatingly associated with the seat bar; axle lock means operatively connected to the seat bar and the parking lever and operable to brake or release the vehicle axle; and conditional force delivery means for normally allowing the axle lock means to brake the vehicle axle and for causing the axle lock means to release the vehicle axle only when the seat bar is in the lowered position with the parking lever shifted into the release position.

BRIEF DESCRIPTION OF THE DRAWINGS

The above and other objects, feature, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
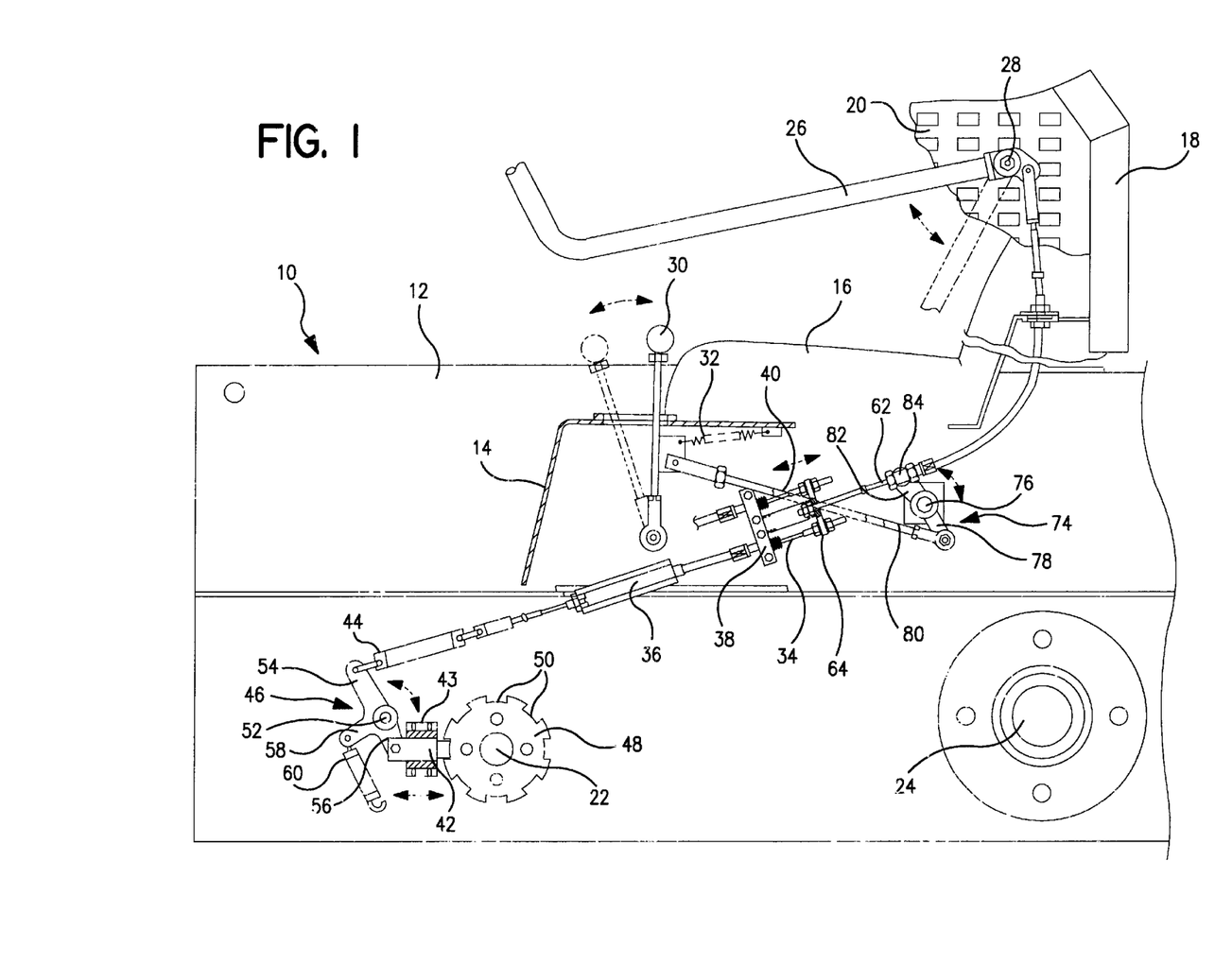
FIG. 1 is a side elevational view showing a skid steer loader employing an improved parking brake device in accordance with the invention, with portions thereof removed for simplicity.
Figure 2:
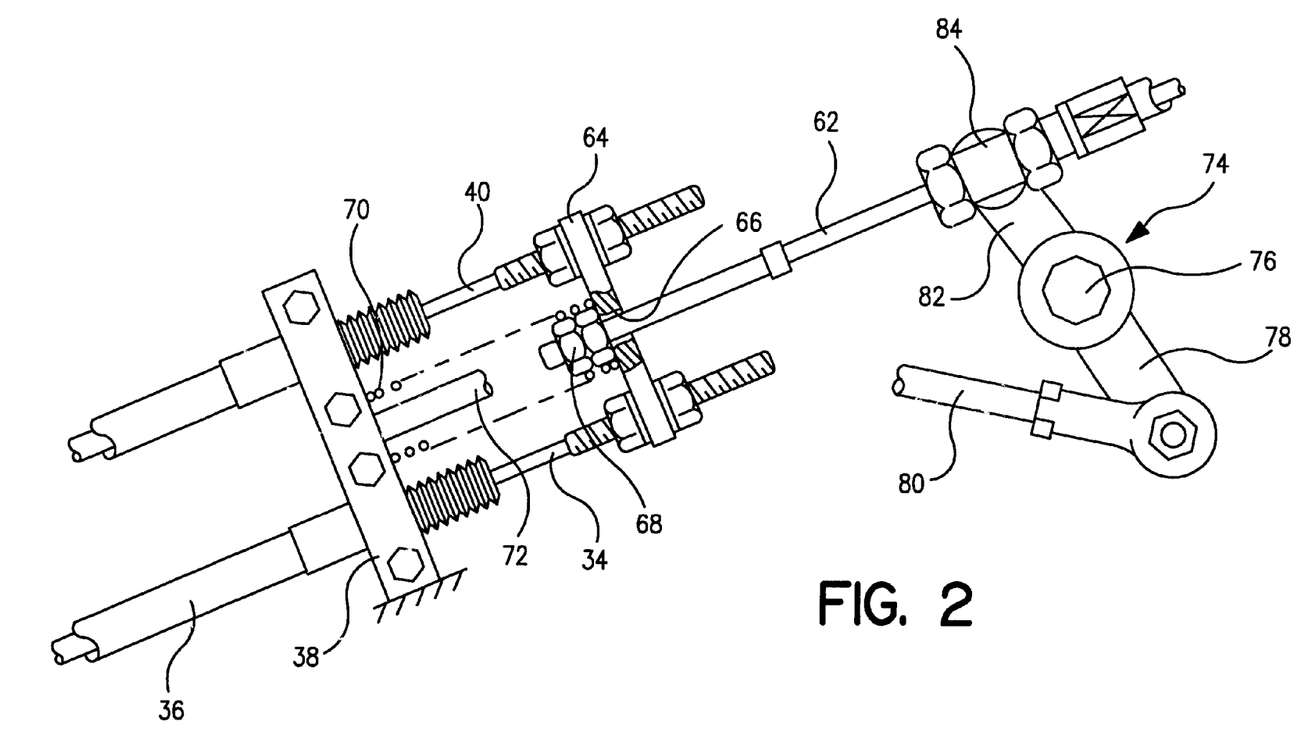
FIG. 2 is a partially enlarged view best showing the coupling manner and the positional relationship of a parking cable and a control cable attached to a seat bar.

Referring now to FIGS. 1 and 2, it will be noted that a skid steer loader is partially illustrated by way of example which employs a parking brake device according to the invention. The skid steer loader includes a vehicle body 10 having a side frame 12 and a hood frame 14. An operator's seat 16 is mounted on the hood frame 14, while a canopy 18 is attached to the side frame 12 to enclose the operator's seat 16. The canopy 18 consists of a side wall 20 and has a front opening (not shown) for operator entrance and egress. Rotatably mounted on the vehicle body 10 are front and rear rotating vehicle axles 22, 24 which are drivingly connected to each other by a chain drive mechanism not shown in the drawings.

The skid steer loader also includes a seat bar 26 mounted to the side wall 20 of the canopy 18 for swinging movement about a pivot axis 28 between a lowered, operator restraint position as indicated in phantom lines in FIG. 1 and a raised, non-protective position as shown in solid lines. The seat bar 26 will secure the operator to the seat 16, when in the lowered position, to protect the operator under rough ride conditions, but will allow the operator to leave the seat 16 when in the raised position.

It can be seen that a parking lever 30 is pivotally attached to the side frame 12 of the vehicle body 10 for shifting movement between a brake position indicated in solid lines in FIG. 1 and a release position shown in phantom lines. The parking lever 30 is normally biased toward the brake position by means of a spring 32 and manually shiftable by the operator between the brake and release positions.

A right side parking cable 34 is slidably removed in an elongated cable holder 36 which in turn remains fixedly secured to the side frame 12 of the vehicle body 10 by a mounting bracket 38. Likewise, a left side parking cable 40 is slidably supported on the side frame 12 in a parallel relationship with respect to the right side parking cable 34. The parking cable 34 is operatively connected at its first end to a locking pawl 42 via an extension spring 44 and a rotary link 46. The locking pawl 42 is slidably attached to the vehicle body 10 by a mounting bracket 43 for movement between an engaged position wherein it comes into engagement with one of the circumferentially disposed notches 50 of a locking disk 48 which is fixedly secured to the front vehicle axle 22 for rotation therewith as a unit and a disengaged position wherein it is disengaged from the notches 50 of the locking disk 48 to allow rotation of the front vehicle axle 22.

The rotary link 46 is pivotally attached to the vehicle body 10 for rotation about a link pivot axis 52 and has first through third arms 54, 56, 58 extending in three different directions. The first arm 54 of the rotary link 46 is connected to the parking cable 34, while the second arm 56 is pivotally coupled with the locking pawl 42. Retained between the third arm 58 of the rotary link 46 and the vehicle body 10 is a tension spring 60 which resiliently urges the rotary link 46 in a counterclockwise direction so that the parking cable 34 can be pulled away from a control cable set forth later and further that the locking pawl 42 can normally engage with the notches 50 of the locking disk 48 to prevent rotation of the front vehicle axle 22.

A control cable 62 is rigidly affixed at its first end to the seat bar 26 in such a manner that the control cable 62 can be pulled away from the parking cable 34 when the seat bar 26 is swung down into the lowered position but pushed toward the parking cable 34 when the seat bar 26 is raised up. The second ends of the parking cable 34 and the control cable 62 are overlapped at least partially and interconnected with each other by an intermediate coupling plate 64 such that the second end of the control cable 62 can move relative to the second end of the parking cable as the seat bar is swung into the raised position or the lowered position.

As clearly shown in FIG. 2, the intermediate coupling plate 64 is fixedly secured to the second end of the parking cables 34, 40 and has an aperture 66 which is formed through the thickness thereof to slidably receive the second end of the control cable 62. A stopper head 68 is provided at the second end of the control cable 62 to prevent separation of the control cable 62 from the coupling plate 64. It should be appreciated that a compression spring 70 is retained between the mounting bracket 38 and the coupling plate 64 to resiliently bias the coupling plate 64 and hence the parking cables 34, 40 toward the control cable 62, thus avoiding any unwanted loosening of the parking cables 34, 40. A spring retainer shaft 72 projects from the mounting bracket 38 in a concentrical relationship with the compression spring 70.

Referring again to FIGS. 1 and 2, it can be seen that a bell crank 74 is pivotally attached to the side frame 12 of the vehicle body 10 for rotation about a crank pivot axis 76. The bell crank 74 has a first arm 78 operatively associated with the parking lever 30 by means of a connecting rod 80 and a second arm 82 provided with a cable holder 84 at its free end. The cable holder 84 is adapted to allow sliding movement of the control cable 62 therethrough when the pulling force of pushing force is applied to the control cable 62 by the swinging movement of the seat bar 26. In the event that the bell crank 74 is rotated by the shifting movement of the parking lever 30, however, the control cable holder 84 will be swung about the crank pivot axis 76 together with the control cable 62, thereby pushing or pulling the control cable 62 independently of the seat bar 26.

Operation of the inventive parking brake device employed in the skid steer loader will now be described with reference to FIGS. 3 through 6.

Figure 3:
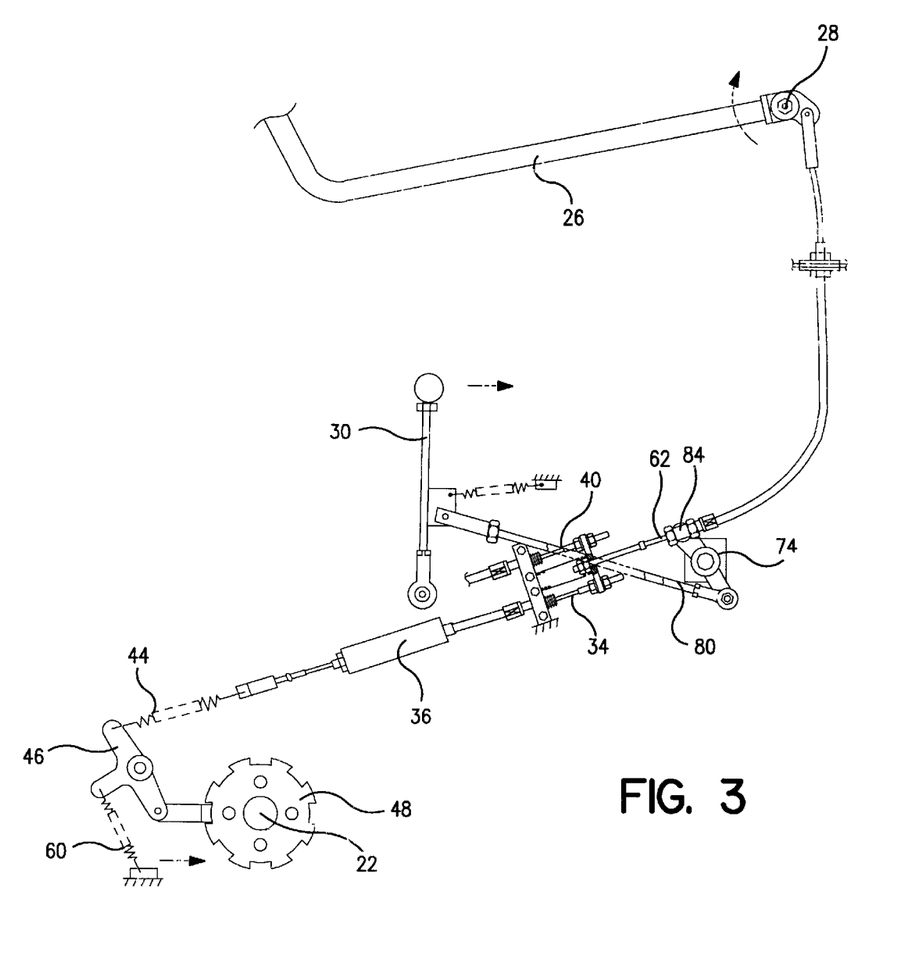
FIG. 3 is a schematic operational view illustrating the parking brake device wherein a front axle is braked with a parking lever in a brake position and a seat bar in a raised position.

As illustrated in FIG. 3, the front vehicle axle 22 is braked in case where the parking lever 30 is in the brake position and the seat bar 26 is in the raised position. Under this condition, no pulling force is applied to the parking cable 34 because the control cable 62 is pushed toward the parking cable 34 firstly by the counterclockwise rotation of the bell crank 74 and secondly by the upward swinging movement of the seat bar 26.

Figure 4:
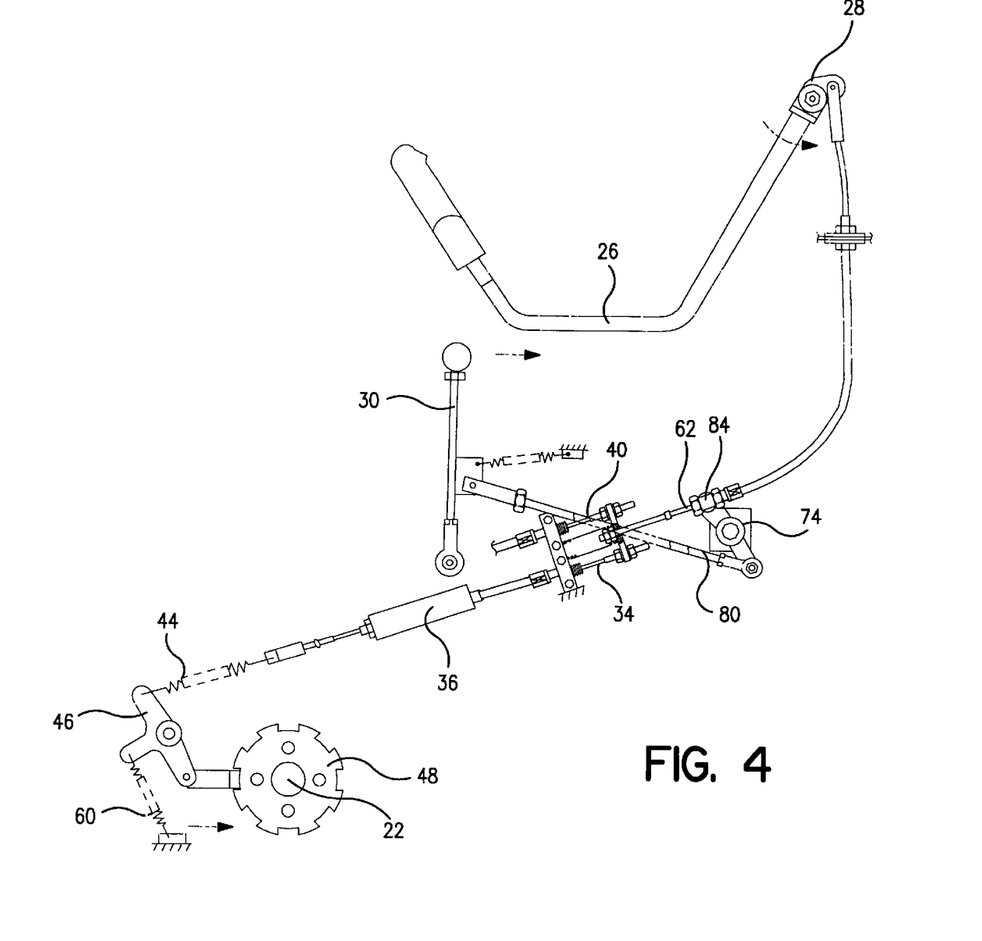
FIG. 4 is a view similar to FIG. 3 but illustrating the parking brake device wherein the front axle is still braked with the parking lever remaining in the brake position and the seat bar swung into a lowered position.

As shown in FIG. 4, the front vehicle axle 22 remains braked in case where the parking lever 30 is in the brake position and the seat bar 26 is swung into the lowered position. Under this condition, no pulling force is applied to the parking cable 34 because the control cable 62 is pushed toward the parking cable 34 by the counterclockwise rotation of the bell crank 74.

Figure 5:
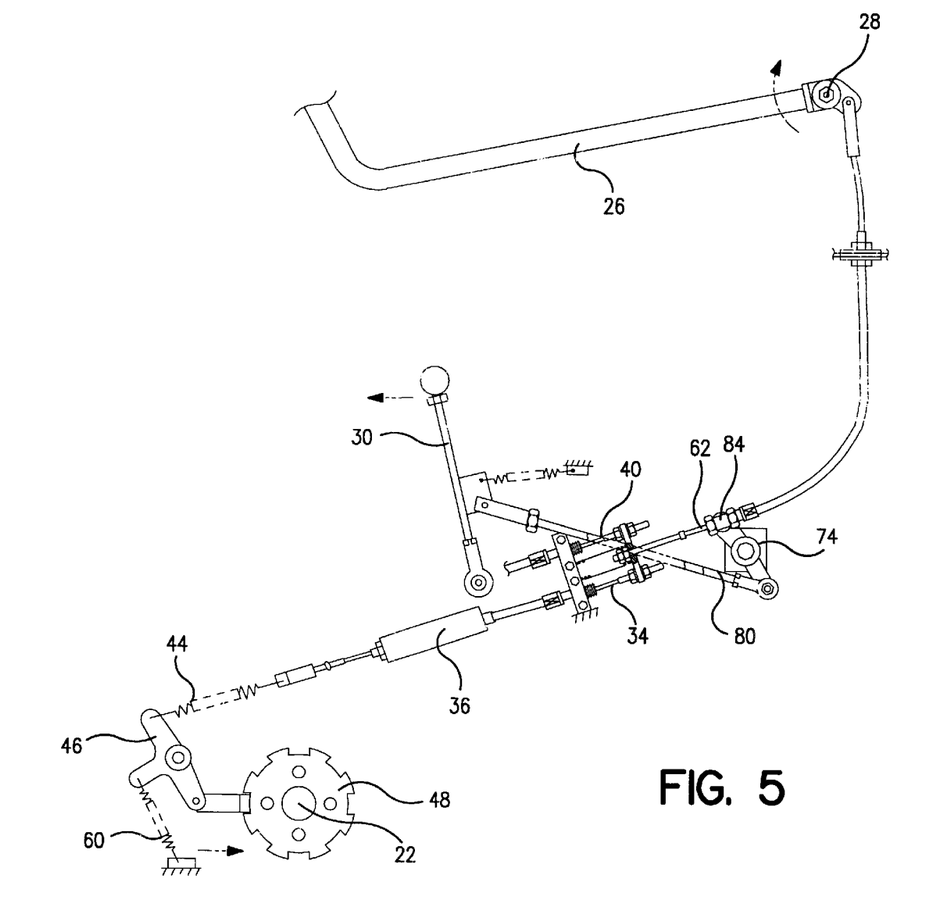
FIG. 5 is a view similar to FIG. 3 but illustrating the parking brake device wherein the front axle is still braked with the parking lever shifted into a release position and the seat bar swung into the raised position.

As illustrated in FIG. 5, the front vehicle axle 22 remains braked in case where the parking lever 30 is shifted into the release position and the seat bar 26 is swung into the raised position. Under this condition, no pulling force is applied to the parking cable 34 because the control cable 62 is pushed toward the parking cable 34 by the upward swinging movement of the seat bar 26.

Figure 6:
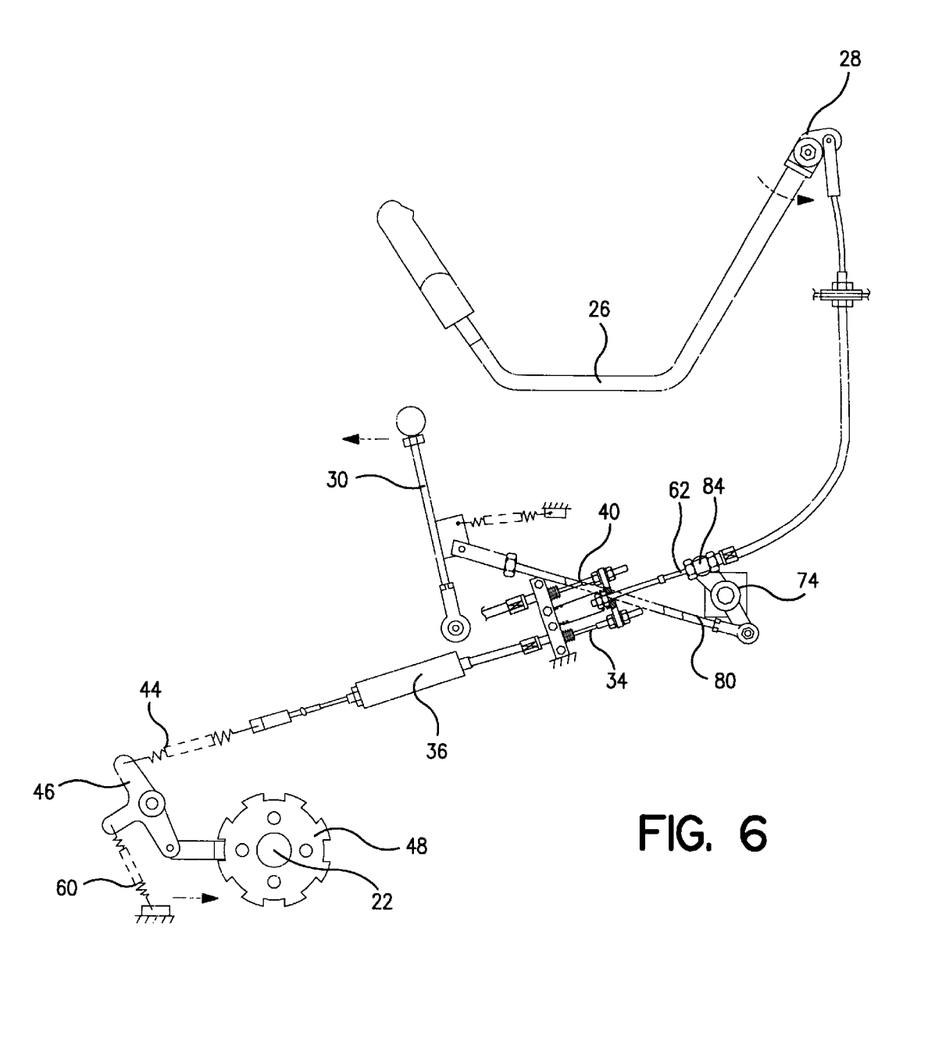
FIG. 6 is a view similar to FIG. 3 but illustrating the parking brake device wherein the front axle is released for free rotation, with the parking brake in the release position and the seat bar swung into the lowered position.

As indicated in FIG. 6, the front vehicle axle 22 will be released for free rotation if the parking lever 30 is shifted into the release position and the seat bar 26 is swung into the lowered position. Under this state, pulling force is exerted to the parking cable 34 because the control cable 62 is pulled away from the parking cable 34 firstly by the clockwise rotation of the bell crank 74 and secondly by the downward swinging movement of the seat bar 76.

While the invention has been shown and described with reference to a preferred embodiment, it should be apparent to one of ordinary skill in the art that many changes and modifications may be made without departing from the scope of the invention as defined in the claims.

What is claimed is:

1. A loader comprising:
   a vehicle body carrying a canopy and a rotating vehicle axle;
   a seat bar mounted to the canopy for swinging movement between a raised position and a lowered operator restraint position;
   a parking lever shiftable between a brake position and a release position and cooperatingly associated with the seat bar;

axle lock means operatively connected to the seat bar and the parking lever and operable to lock or release the vehicle axle, said axle lock means comprising  a lock disk fixedly secured to the vehicle axle and having a plurality of circumferentially disposed notches, and  a locking pawl slidingly movable between an engaged position in which the pawl engages with one of the notches of the locking disk to prevent rotation of the vehicle axle and a disengaged position in which the pawl is disengaged from the notches to allow the rotation of the vehicle axle; and conditional force delivery means for normally allowing the axle lock means to lock the vehicle axle and for causing the axle lock means to release the vehicle axle only when the seat bar is in the lowered position with the parking lever shifted into the release position, said conditional force delivery means comprising  a parking cable operatively connected to the lock pawl at a first end,  an intermediate coupling plate affixed to a second end of the parking cable and provided with an aperture,  a control cable rigidly connected to the seat bar at a first end and slidably inserted through the aperture of the coupling plate at a second end, the control cable having a stopper head at the second end so sized as to avoid removal of the control cable from the aperture of the coupling plate, and  a bell crank pivotally attached to the vehicle body and having first and second arms, the first arm operatively connected to the parking lever, the second arm provided with a control cable holder slidably supporting the control cable and rotatable about a crank pivot axis together with the control cable.

2. The loader as recited in claim 1, wherein said conditional force delivery means further comprises:

a parking cable holder fixedly attached to the vehicle body by means of a mounting bracket; and  a compression spring retained between the mounting bracket and the intermediate coupling plate for resiliently urging the coupling plate and the parking cable toward the control cable.

3. The loader as recited in claim 1, wherein said parking cable of the conditional force delivery means is connected to the locking pawl by way of an extension spring and a rotary link, the rotary link rotatable about a link pivot axis and having first, second and third arms extending in different directions, the first arm connected to the parking cable via the extension spring, and the second arm pivotally connected to the locking pawl of the axle locking means.

4. The loader as recited in claim 3, wherein said conditional force delivery means further comprises a tension spring retained between the vehicle body and the third arm of the rotary link so that it can apply resilient pulling force to the parking cable away from the control cable.

5. A loader comprising:

a vehicle body carrying a canopy and a rotating vehicle axle;

a seat bar mounted to the canopy for swinging movement between a raised position and a lowered, operator restraint position;

a parking lever shiftable between a brake position and a release position and cooperatingly associated with the seat bar;

axle lock means operatively connected to the seat bar and the parking lever and operable to lock or release the vehicle axle; and  conditional force delivery means for normally allowing the axle lock means to lock the vehicle axle and for causing the axle lock means to release the vehicle axle only when the seat bar is in the lowered position with the parking lever shifted into the release position, said conditional force delivery means comprising   a parking cable having a first end operatively connected to the axle lock means and a second free end,   a control cable having a first end rigidly connected to the seat bar and a second free end extending toward the second end of the parking cable, and   cable coupling means for interconnecting the second ends of the parking cable and the control cable moving relative to the second end of the parking cable as the seat bar is swung into the raised position or the lowered position,  wherein said cable coupling means including an intermediate coupling plate affixed to the second end of the parking cable and provided with an aperture for slidably receiving the second end of the control cable, and a stopper head provided at the second end of the control cable to prevent separation of the control cable from the coupling plate.

6. The loader as recited in claim 5, wherein said stopper head is disposed at such a position on the control cable that it contacts against the coupling plate whenever the seat bar is in the lowered position.

7. The loader is recited in claim 5, wherein said conditional force delivery means further comprises crank means operatively connected to the parking lever and holding the control cable in a slidable manner, the crank means rotatable about a crank pivot axis together with the control cable so that the second end of the control cable is pushed toward or pulled away from the parking cable.

8. A lower comprising:

a vehicle body carrying a canopy and a rotating vehicle axle;

a seat bar mounted to the canopy for swinging movement between a raised position and a lowered, operator restraint position;

a parking lever shiftable between a brake position and a release position and a release position and cooperatingly associated with the seat bar;

axle lock means operatively connected to the seat bar and the parking lever and operable to lock or release the vehicle axle; and  conditional force delivery means for normally allowing the axle lock means to lock the vehicle axle and for causing the axle lock means to release the vehicle axle only when the seat bar is in the lowered position with the parking lever shifted into the release position, and conditional force delivery means comprising   a parking cable having a first end operatively connected to the axle lock means and a second free end,   a control cable having a first end rigidly connected to the seat bar and a second free end extending toward the second end of the parking cable,   cable coupling means for interconnecting the second ends of the parking cable and the control cable in a manner that the second end of the control cable moves relative to the second end of the parking cable as the seat bar is swung into the raised position or the lowered position, and crank means operatively connected to the parking lever and holding the control cable in a slidable manner, the crank means rotatable about a crank pivot axis together with the control cable so that the second end of the control cable is pushed toward or pulled away from the parking cable.

* * * * *